United States Patent [19]

Ochiai

[11] Patent Number: 5,022,448
[45] Date of Patent: Jun. 11, 1991

[54] PNEUMATIC TIRE INCLUDING LATERAL TREAD GROOVES WITH A BRIDGE THEREACROSS

[75] Inventor: Kiyoshi Ochiai, Kobe, Japan

[73] Assignee: Sumitomo Rubber Industries, Ltd., Hyogo, Japan

[21] Appl. No.: 352,894

[22] Filed: May 17, 1989

[51] Int. Cl.⁵ .............................................. B60C 11/08
[52] U.S. Cl. ................................................. 152/209 R
[58] Field of Search .......... 152/209 R, 209 D, 209 A; 425/28.1, 812; 249/141

[56] References Cited

U.S. PATENT DOCUMENTS 2,661,041 12/1953 Walsh ............................. 152/209 R
4,881,881 11/1989 Rockarts et al. ................. 425/28.1

FOREIGN PATENT DOCUMENTS 291205 12/1986 Japan ............................... 152/209 R Primary Examiner—Michael W. Ball
Assistant Examiner—Geofrey L. Knable
Attorney, Agent, or Firm—Birch, Stewart, Kolasch & Birch

[57] ABSTRACT

A pneumatic tire having lateral tread grooves extending parallel or aslant to the axial direction of the tire, wherein the lateral tread grooves are provided with a bridge which extends between the opposed groove sidewalls thereof apart from the groove base thereof to connect the groove sidewalls with each other, whereby the movement of the groove sidewalls and the deformation thereof when contacting with and leaving the ground is reduced to prevent uneven wear such as heel and toe wear without deteriorating the braking performance.

13 Claims, 9 Drawing Sheets

FIG.6
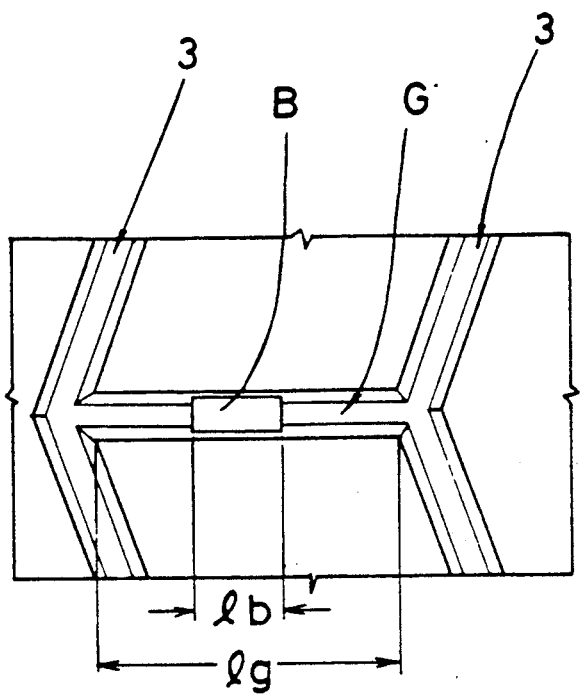
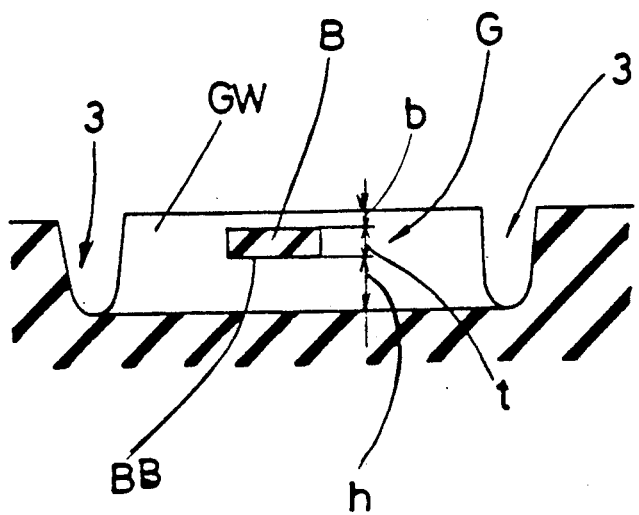
FIG.7

FIG.11
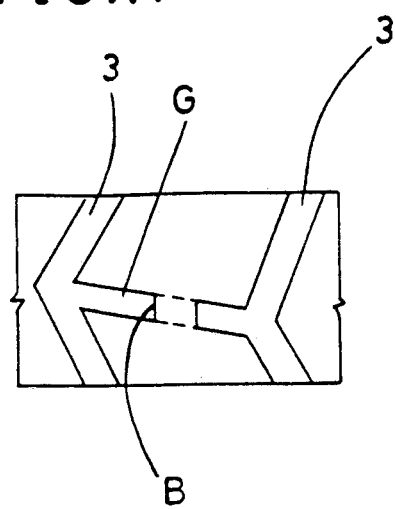
FIG.12
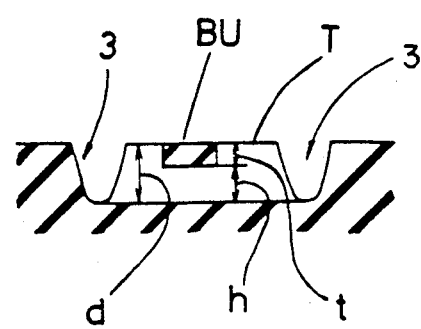
FIG.13
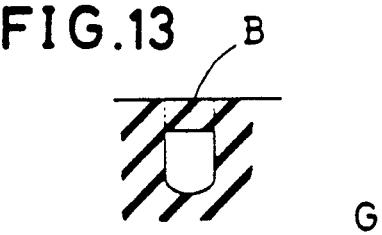
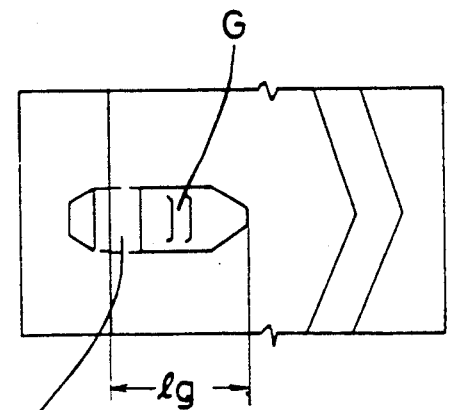
FIG.14
FIG.15
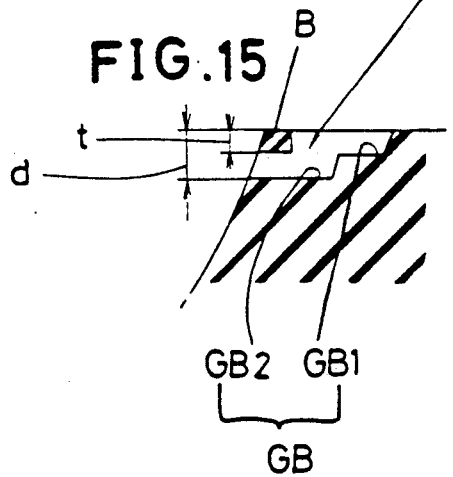

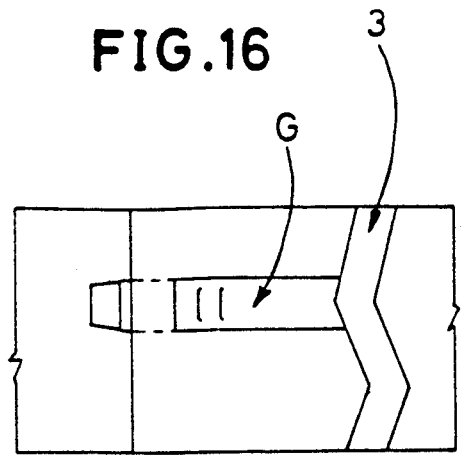
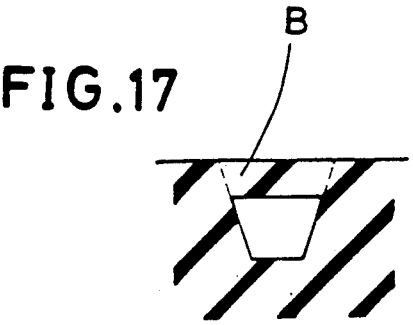
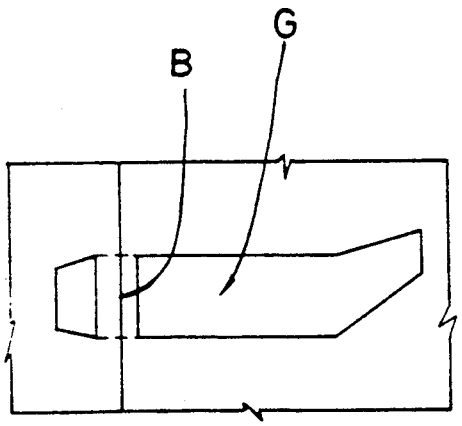
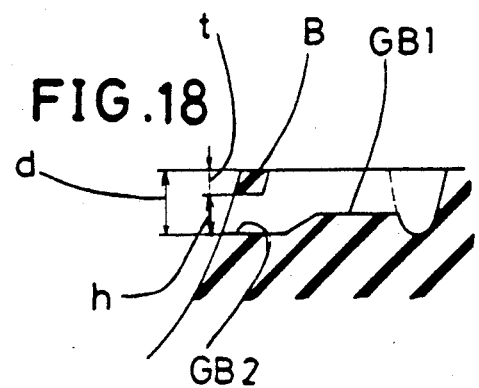
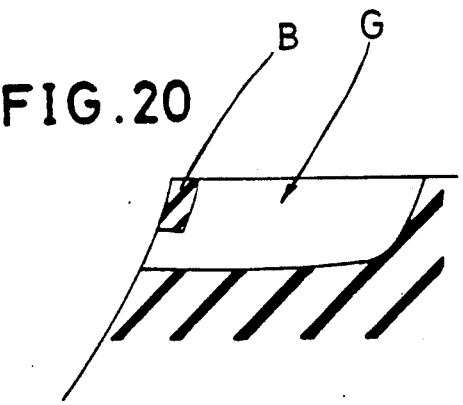

5,022,448

PNEUMATIC TIRE INCLUDING LATERAL TREAD GROOVES WITH A BRIDGE THEREACROSS

BACKGROUND OF THE INVENTION

The present invention relates to a pneumatic tire having less heel and toe wear around lateral tread grooves.

Various types of tread patterns have been used for a pneumatic tire, for examples, a rib type pattern consisting of main grooves extending circumferentially of the tire in a straight or zigzag configuration, a rib-lug type pattern consisting of main grooves and axially extending lateral grooves formed in the shoulder regions of the tire, a tread pattern called all-season type or snow type consisting of main grooves and lateral grooves crossing the main groove, a lug type pattern consisting of wide lateral grooves extending to the equator of the tire from each tread edge, a block type pattern consisting of wide main grooves and wide lateral grooves intersecting the wide main grooves, and the like.

In a tire provided with lateral grooves on the tread like the above-mentioned rib-lug type or all season type patterns, its performance such as traction, wet grip and the like is improved by such lateral grooves. Such lateral grooves, however, shorten the wear life of the tire.

As shown in FIG. 21, the tread face T wears partially at radially outward portions of the groove sidewalls GW of the lateral groove G, and the wear K of the portion on the kick-out side Ga (the toe side) is faster and greater than that on the other step-in side (the heel side), and accompanying with the wear K the wear of the portion on the step-in side grows to a so-called heel and toe wear, whereby the wear life is shortened.

In order to prevent such abnormal wear, there have been proposed to increase the hardness of the rubber for the sidewalls of the lateral grooves, to decrease partly the groove depth of the lateral grooves, to increase the inclination angle of the sidewalls of the lateral groove, to and decrease the groove width and the like, which are intended to improve the resistance to wear or to lessen the amount of the slip of the tread against the road face by lessening the movement of the groove sidewalls GW into the lateral groove G.

However, to use the harder rubber for the sidewalls of the lateral groove complicates the production of the tire, and such rubber partly increases the hardness at the tread face, which sometimes degrades tire performance such as road traction. Further, the decreased depth of the lateral grooves tends to decrease traction in on-the-snow performance and wet grip. Also by increasing the inclination angle of the groove sidewall and decreasing the groove width, a substantial improvement in preventing uneven wear can not be expected.

It is therefore, an object of the present invention to provide a pneumatic tire in which uneven wear of the tread is prevented and tire life is prolonged by bridging the lateral grooves disposed in the tire treat.

SUMMARY OF THE INVENTION

According to the present invention, a pneumatic tire is provided in the tread portion thereof with lateral grooves G extending parallel or aslant to the axial direction of the tire, wherein the lateral groove is provided with a bridge B extending between the opposed sidewalls GW thereof apart from the groove base GB to connect the sidewalls GW with each other.

Accordingly, the movement of the groove sidewalls into the lateral groove G and the deformation thereof when contacting the ground and leaving the ground, can be effectively reduced to prevent uneven wear such as heel and toe wear without causing deterioration in the braking performance, traction, road grip and the like of the tire. In other words, as the tread wear progresses, the lateral grooves become more shallow, and the bridge wears off because the bridge is formed apart from the groove base. Accordingly, the tire performance is maintained even in the last stage of tire life.

BRIEF DESCRIPTION OF THE DRAWINGS

Embodiments of the present invention will now be described in detail with reference to the accompanying drawings, in which:

FIG. 6 is a plan view thereof;

FIG. 7 is a sectional view thereof;

FIG. 11 is a plan view showing another embodiment of the present invention;

FIGS. 12 and 13 are sectional views thereof;

FIGS. 14 is a plan view showing a further embodiment of the present invention;

FIG. 15 is a sectional view thereof;

FIG. 16 is a plan view showing another embodiment of the present invention;

FIGS. 17 and 18 are sectional view thereof;

FIG. 19 is a plan view showing another embodiment of the present invention;

FIG. 20 is a sectional view thereof; and

DETAILED DESCRIPTION OF THE INVENTION

Figure 1:
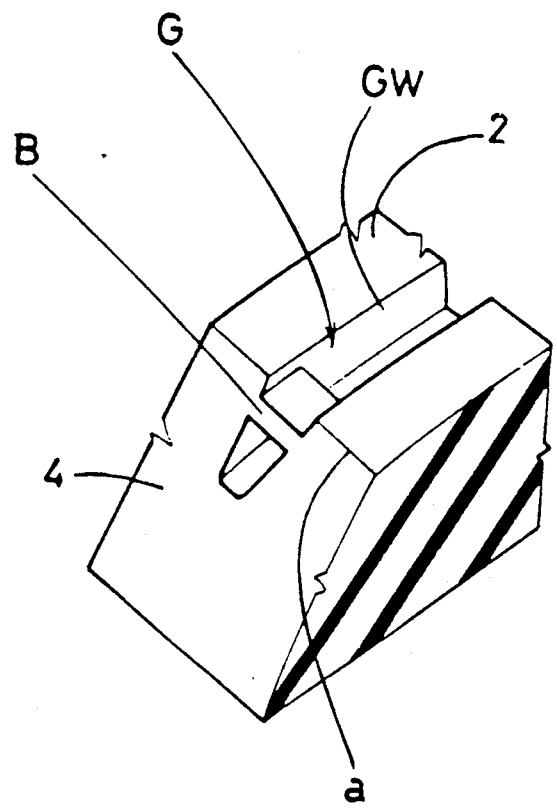
FIG. 1 is a perspective view showing an embodiment of the present invention.
Figures 2, 3, 4:
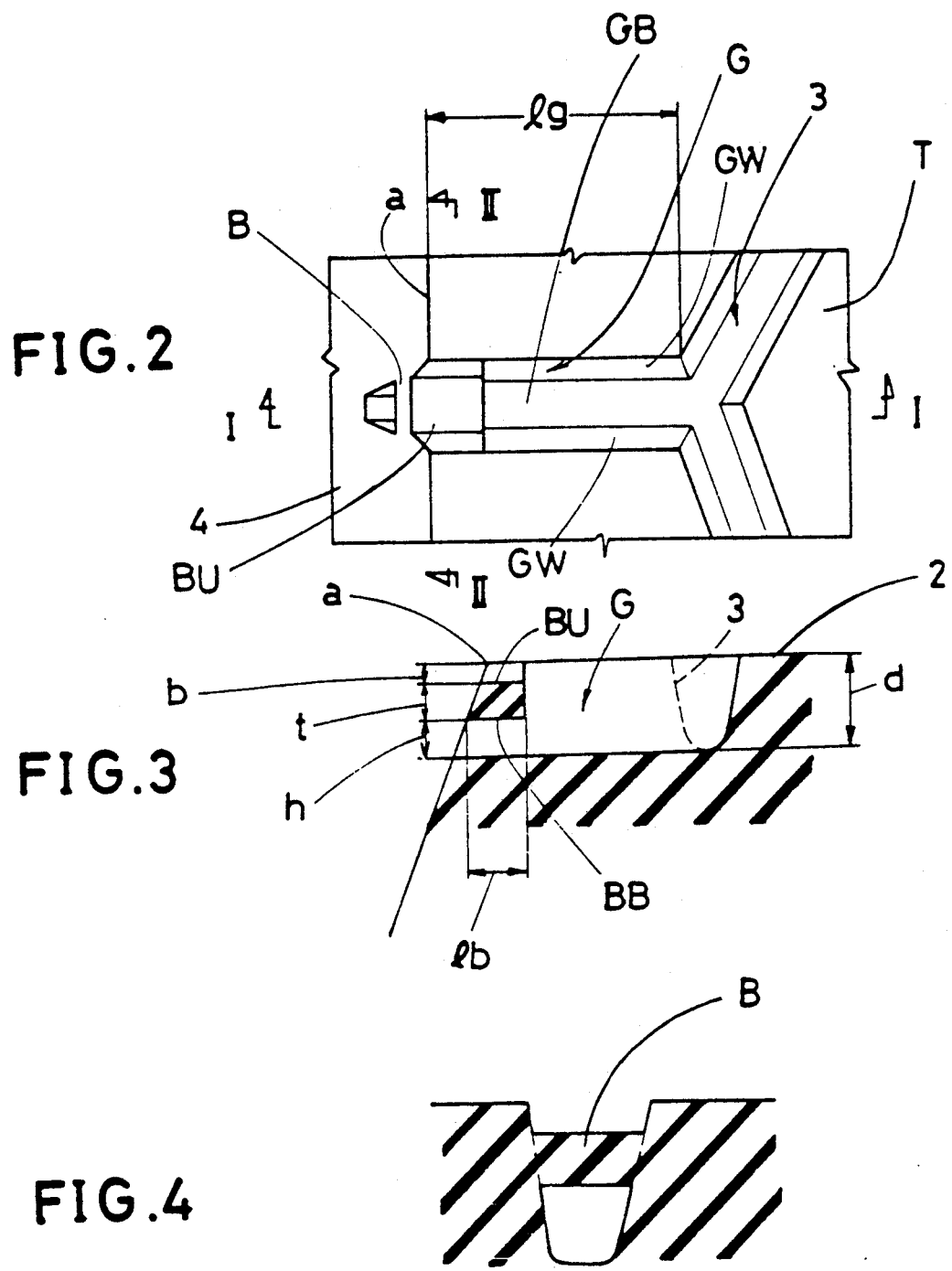
FIG. 2 is a plan view thereof.
FIG. 3 is a sectional view taken along the line I—I thereof.
FIG. 4 is a sectional view taken along the line II—II of FIG. 2.

In FIGS. 1 to 4, the tire of the present invention is formed as a heavy duty tire for trucks and buses, and the tread portion 2 thereof is provided with circumferentially extending main grooves and axially extending lateral grooves to form an all season type tread pattern.

The main grooves 3 are extended zigzag in the circumferential direction of the tire.

The lateral grooves G extend from the angled portions of the zigzag main groove 3 into the shoulder region 4 at a right angle to the circumferential direction of the tire, and in this example, the axially outer end of the lateral groove is opened at the shoulder region, that is, the side face of the tire. The lateral groove is provided with a bridge B.

The bridge is formed between the opposed sidewalls GW of the lateral groove G and above the groove base GB, that is, apart from the groove base GB and near the tread edge (a) between the tread region 2 and the shoulder regions 4 in the axial direction of the tire.

Because the opposed groove sidewalls GW are connected with each other by the bridge B in such manner, the stiffness of the sidewalls is increased and the amount of movement thereof is decreased. Therefore, the slip against the ground is lessened on both sides of the lateral groove, and uneven wear of the tread is prevented. Especially, by forming the bridge near the tread edge (a), the movement of the sidewalls into the groove is effectively prevented.

Further, the above-mentioned bridge B is located under the tread face T so that a certain distance b is formed between the top face BU of the bridge and the tread face T in the radial direction of the tire, whereby a good road grip is provided in the early stage of the tire life.

The ratio b/d of the above-mentioned distance b to the groove depth d of the lateral groove from the tread face T to the groove base GB is in a range of 0 to 0.2.

Further, the ratio t/d of the thickness t of the bridge B in the radial direction to the groove depth d is not less than 0.1 and not more than 0.4.

Furthermore, the radial distance h of the bottom face BB of the bridge from the groove base GB is not less than the thickness t of the bridge (t<h).

Still furthermore, the ratio lb/lg of the length lb of the bridge at the bottom face BB in the longitudinal direction of the lateral groove G provided with the same bridge B to the length lg of the same lateral groove G in the longitudinal direction is not less than 0.05 and not more than 0.35.

A field test was conducted. 10.00R20 test tires mounted on a 7.00T rim were installed on the front axle of a 2-2D wheel type dump truck and inflated to 8.0 kgf/sq.cm, and then heel and toe wear was measured after 20,000 km running. The test results are graphed in FIGS. 8 and 9.

Figure 8:
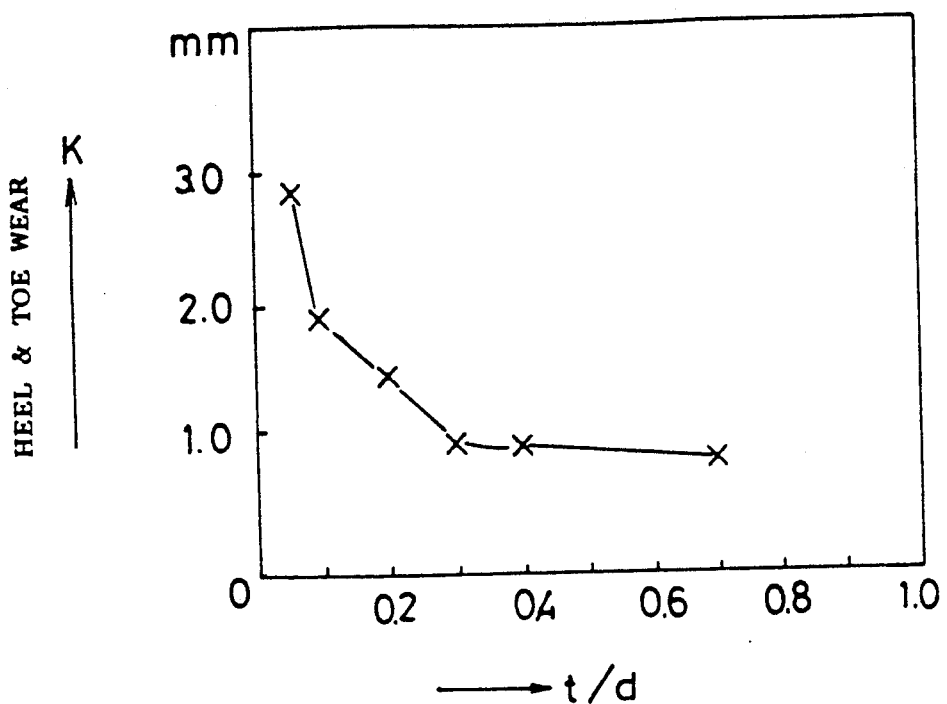
FIG. 8 is a graph showing the relationship between t/d ratio and heel and toe wear.
Figure 21:
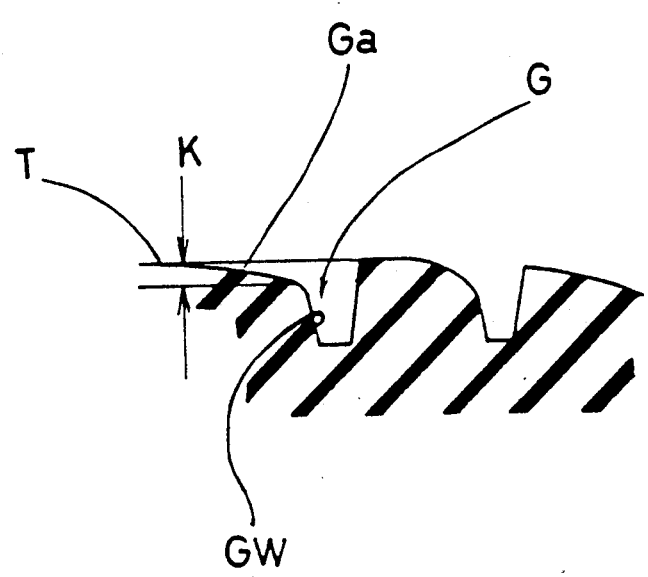
FIG. 21 is a sectional view showing the heel and toe wear.

In FIG. 8, the ratio t/d of the thickness t of the bridge to the groove depth d is shown as the axis of abscissa and the heel and toe wear K (FIG. 21) is shown as the axis of ordinate. In the tires used in this test, the radial distance h of the bottom face of the bridge from the groove base is 10.0 mm, the length lb of the bottom face in the longitudinal direction of the lateral groove is 8.0 mm, and the length lg of the lateral groove is 35 mm.

In general, when the heel and toe wear k is under 2.0 mm, such tire is thought to be marketable.

Figure 9:
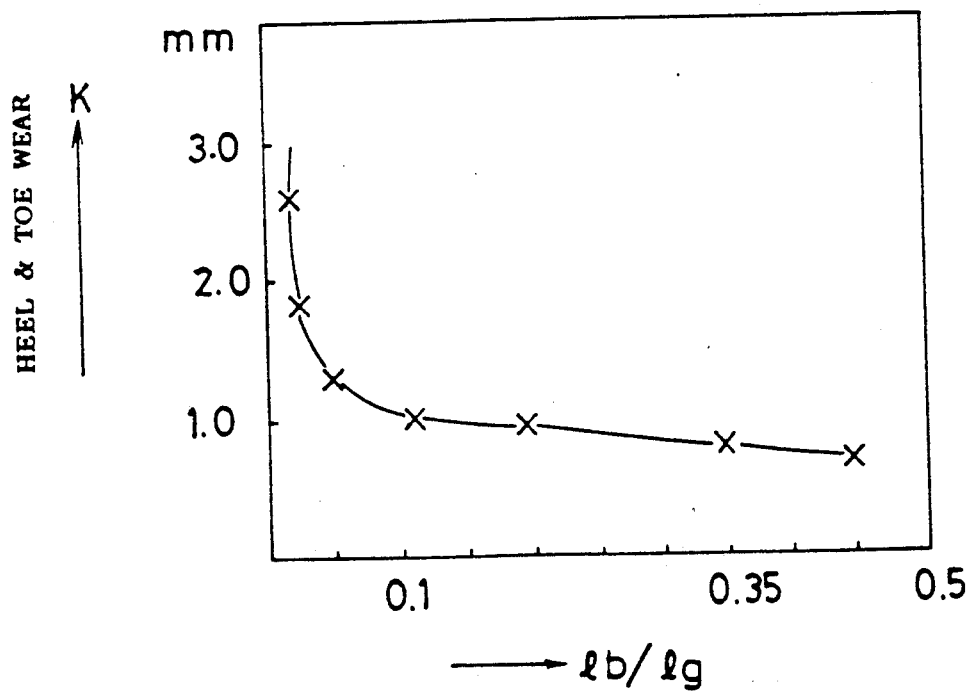
FIG. 9 is a graph showing the relationship between lb/lg ratio and heel and toe wear.

In FIG. 9, the ratio lb/lg of the length lb of the bottom face of the bridge to the length lg of the lateral groove G is shown as the axis of abscissa and the heel and toe wear is shown as the axis of ordinate, where the ratio t/d is 0.3 and the thickness t is 0.8 times the distance h of the bottom face of the bridge.

Figure 10:
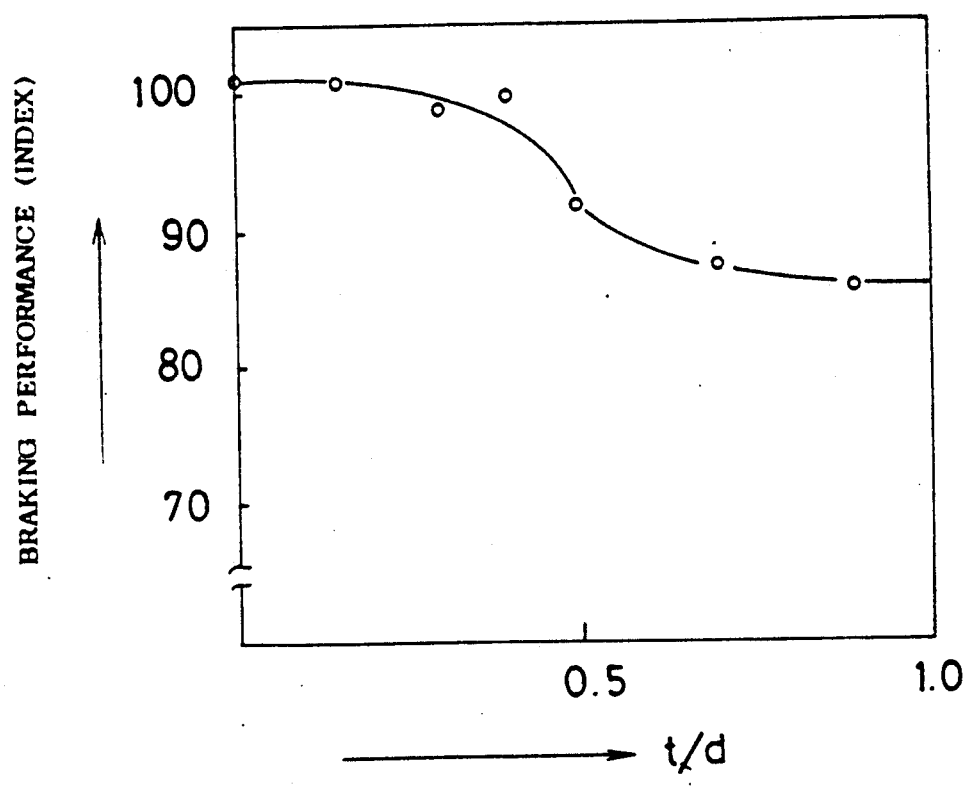
FIG. 10 is a graph showing a relationship between t/d ratio and braking performance.

FIG. 10 shows the results of braking distance tests on a wet asphalt-paved road, in which the braking distance from 80km/h to a stop was measured.

In FIG. 10, the ratio t/d and the wet braking performance are shown as the axis of abscissa and the axis of ordinate, respectively, wherein the wet braking performance is indicated in terms of index based on the assumption that the braking distance in a tire having no bridge is 100.

As shown in FIG. 8, in the tires having the ratio t/d being not smaller than 0.1, the heel and toe wear K became under 2.0 mm, which apparently shows that the bridge which connects the groove sidewalls was able to lessen the movement thereof when contacting with the ground as well as when leaving for the ground, and the amount of the slip of the lug (the tread element circumferentially divided by the lateral grooves) against the ground was reduced specially effectively when leaving for the ground, and as a result the amount of the wear K was greatly reduced.

Moreover, as shown in FIG. 10, when the ratio t/d was set to be more than 0.4, the wet braking performance was decreased. If the ratio t/d is more than 0.4, the bridge become too thick, and it impedes the drainage of the groove and excessively restricts the movement of the groove sidewalls, both of which lessen the road grip. Accordingly, the ratio t/d is preferably set to be not more than 0.4 and further not less than 0.1.

Further, if the radial height h of the bottom BB of the bridge B from the groove base GB is less than such thickness t, the drainage of the lateral groove G is also hindered, and the effect of the bridge B derived from connecting the groove sidewalls is diminished because the bridge B provides support to only the lower sidewalls.

Furthermore, if the ratio lb/lg of the length lb of the bottom face BB to the length lg of the lateral groove is less than 0.05, such a bridge can not prevent the movement of the groove sidewalls. As a result, it becomes difficult to control the heel and toe wear K under 2.0 mm. If the ratio is more than 0.35, it become difficult to make the bridge by using a vulcanizing mould. Accordingly, the ratio lb/lg was defined as being not less than 0.05 and not more than 0.35.

As previously mentioned, the heel and toe wear can be reduced by means of the bridge B which connects the opposed groove sidewalls, and at the same time, the braking performance is maintained by setting the ratio t/d in the above specified range.

The bridge B is gradually worn out while in use and disappears at last, and accordingly the lateral groove is fully opened to maintain the braking performance all over the tire life.

Figure 5:
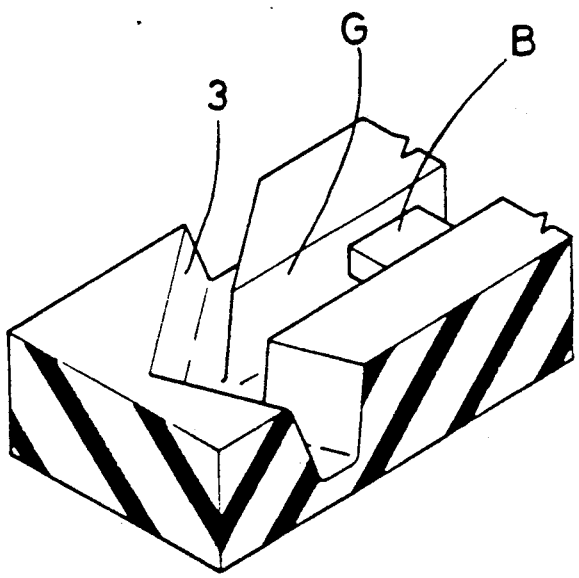
FIG. 5 is a perspective view showing another embodiment of the present invention.

FIGS. 5 to 7 shows another embodiment of the present invention, wherein the lateral groove G is formed in the tread crown region and extended between the adjacent two zig-zag main grooves 3, and the bridge B is formed in the center of the lateral groove in the longitudinal direction of the groove. In this case too, by setting the ratio t/d and the ratio lb/lg and the relation between the thickness t and the height h within the above-mentioned ranges in the same manner as the embodiment shown in FIGS. 1 to 4, the uneven wear is diminished without deteriorating the braking performance.

Further, in the present invention, as shown in FIGS. 11 to 13, the lateral groove G can be arranged obliquely, and the top face BU can be the same height as the tread face T.

FIGS. 14 to 15 show another embodiment having a rib-lug type tread pattern, wherein the lateral groove G is provided at the groove base GB thereof with a deeper portion GB2 being deeper than the main portion GB1 so that the deeper portion is located beneath the bridge B.

In this case, the depth at the deeper portion GB2 is used as the above-mentioned groove depth d to define the ratio t/d, but the length lg of the lateral groove G is defined as the total length lb including the main portion and the deeper portion. Accordingly, it becomes possible to increase the thickness t of the bridge.

FIGS. 16 to 18 show an all season type tread pattern in which the lateral groove G is provided with the deeper portion GB2 beneath the bridge B similarly to the former embodiment.

FIGS. 19 and 20 show a lug type tread pattern.

Thus, the present invention can be applied to various kinds of tread patterns for various kinds of tires such as heavy duty tires for trucks and buses, passenger car tires and so on.

As described above, according to the present invention, the opposed sidewalls of the lateral groove are connected with each other by the bridge, therefore the bridge can control the movement of the groove sidewalls when contacting with the ground and when leaving for the ground. Accordingly, the abnormal wear such as heel and toe wear is prevented without deteriorating wet grip performance.

Incidentally, such bridge can be formed in or after the tire vulcanizing process.

In order to form the bridges in the tire vulcanizing process, it is necessary to arrange the bridges near the positions of the split faces of the vulcanizing mold. Therefore, the number of the split faces and the position thereof may be adjusted to form the bridges at a desired position in the axial direction. Further, it may be necessary to limit the inclining angle of the lateral groove in such a range that the demoulding process is possible.

In order to form the bridge after the tire vulcanizing process, it can be employed to drill or bore the lower part of the bridge. In this case there is no need to limit the inclining angle of the lateral groove in a narrow range. Therefore, the bridge can be formed in the lateral groove which is largely inclined, for example, at 45 degrees.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

I claim:

1. A pneumatic tire having a tread provided with lateral grooves extending parallel or aslant to the axial direction of the tire, each of said lateral grooves being provided with a bridge member extending between the opposed groove sidewalls thereof to join the groove sidewalls to each other, said bridge having a thickness t not less than 0.1 times and not more than 0.4 times the lateral groove depth d in the radial direction of the tire, said bridge being spaced apart from the groove bottom so that the height h of the bridge bottom from said groove bottom is not less than said thickness t of the bridge in the radial direction of the tire, and the length lb of the bridge at the bottom thereof in the longitudinal direction of the lateral groove being not less than 0.05 times and not more than 0.35 times the length lg of the lateral groove in the longitudinal direction.

2. The tire according to claim 1, wherein said bridges each have a top face flush with the tread surface.

3. The tire according to claim 1, wherein said bridges are located below the tread surface and the depth from the tread surface to the bridge top is less than 0.2 times the lateral groove depth.

4. The tire according to claim 1, wherein said bridges are formed adjacent to the edges of the tread.

5. The tire according to claim 2, wherein said brides are formed adjacent to the edges of the tread.

6. The tire according to claim 3, wherein said bridges are formed adjacent to the edges of the tread.

7. The tire according to claim 1, wherein said bridges are formed in the center of the respective lateral grooves in the longitudinal direction thereof.

8. The tire according to claim 2, wherein said bridges are formed in the center of the respective lateral grooves in the longitudinal direction thereof.

9. The tire according to claim 3, wherein said bridges are formed in the center of the respective lateral grooves in the longitudinal direction thereof.

10. The tire according to claim 1, wherein said bridges consist of bridges formed adjacent to the edges of the tread and bridges formed in the center of the respective lateral grooves in the longitudinal direction thereof.

11. The tire according to claim 2, wherein said bridges consist of bridges formed adjacent to the edges of the tread and bridges formed in the center of the respective lateral grooves in the longitudinal direction thereof.

12. The tire according to claim 3, wherein said bridges consist of bridges formed adjacent to the edges of the tread and bridges formed in the center of the respective lateral grooves in the longitudinal direction thereof.

13. The tire according to claim 1, wherein each lateral groove is provided beneath the bridge thereof with a portion which is deeper than the remaining main portion of the groove.

* * * * *